United States Patent
Réblewski et al.

(10) Patent No.: US 7,260,218 B2
(45) Date of Patent: Aug. 21, 2007

(54) CONFIGURABLE CIRCUIT WITH CONFIGURATION DATA PROTECTION FEATURES

(75) Inventors: Frédéric Réblewski, Paris (FR); Olivier Lepape, Paris (FR)

(73) Assignee: M2000, Bievres (FR)

( * ) Notice: Subject to any disclaimer, the term of this patent is extended or adjusted under 35 U.S.C. 154(b) by 84 days.

(21) Appl. No.: 11/268,932

(22) Filed: Nov. 8, 2005

(65) Prior Publication Data

US 2007/0103193 A1    May 10, 2007

(51) Int. Cl.
*H04L 1/06* (2006.01)
*H04L 9/06* (2006.01)
*H04L 9/00* (2006.01)

(52) U.S. Cl. ............... 380/37; 380/29; 326/8
(58) Field of Classification Search ............ 380/29, 380/37; 326/8
See application file for complete search history.

(56) References Cited

U.S. PATENT DOCUMENTS

| | | | | |
|---|---|---|---|---|
| 4,521,853 A | * | 6/1985 | Guttag | 711/163 |
| 4,590,552 A | * | 5/1986 | Guttag et al. | 711/163 |
| 5,768,372 A | | 6/1998 | Sung et al. | |
| 6,324,676 B1 | | 11/2001 | Burnham et al. | |
| 6,457,125 B1 | | 9/2002 | Matthews, Jr. et al. | |
| 6,462,992 B2 | * | 10/2002 | Harari et al. | 365/185.33 |
| 7,076,060 B1 | * | 7/2006 | Bilchev | 380/37 |
| 2001/0032318 A1 | | 10/2001 | Tip et al. | |
| 2001/0050989 A1 | * | 12/2001 | Zakiya | 380/29 |
| 2004/0223610 A1 | * | 11/2004 | Henry et al. | 380/37 |
| 2005/0195974 A1 | * | 9/2005 | Kurdziel | 380/29 |

FOREIGN PATENT DOCUMENTS

EP    1 124 330 A2    8/2001
EP    1 170 868 A1    1/2002

* cited by examiner

*Primary Examiner*—Vibol Tan
(74) *Attorney, Agent, or Firm*—Schwabe, Williamson & Wyatt, P.C.

(57) ABSTRACT

A configurable circuit that includes configuration data protection features, and related methods, are described herein.

22 Claims, 5 Drawing Sheets

CONFIGURABLE CIRCUIT WITH CONFIGURATION DATA PROTECTION FEATURES

TECHNICAL FIELD

The present invention relates to the field of configurable circuits. More specifically, the present invention relates to configurable circuits with configuration data protection features.

BACKGROUND

In the current state of integrated circuit technology, configurable circuits are used in a number of different applications. For example, one well-known type of configurable circuits is a reconfigurable circuit, such as those that incorporate Field Programmable Gate Arrays (FPGAs). Such a configurable circuit is commonly used in emulation systems. However, because of their flexibility, configurable circuits are employed in many other applications other than in emulation systems. These other applications include their use in the fields of digital signal processing (DSP), medical imaging, computer vision, speech recognition, and so forth.

A configurable circuit typically includes a number of configurable functions that may be programmed and configured to behave and perform a variety of functions. In the case where the configurable circuit is a reconfigurable circuit, the circuit will also typically include a number of configurable interconnects (e.g., crossbar devices) that can be programmed to, among other things, selectively interconnect the input/outputs of the configurable functions. A configurable circuit will further include a configuration memory that is coupled to the configurable functions (and the configurable interconnects in the case of reconfigurable circuits) for storing configuration data that is used to configure the configurable functions (and the configurable interconnects).

From the time that a configurable circuit is first fabricated and assembled to the time that the configurable circuit is in the hands of the end-user, a configurable circuit will typically go through at least three phases. In the first phase, also known as the production phase, the configurable circuit is fabricated and assembled. The production phase is typically executed by the manufacturer of the circuit. Once the configurable circuit is built, the circuit is provided to an "application designer" or simply "designer." Note that the demarcation between a manufacturer and a designer is sometimes murky and, in some instances, the manufacturer may also be the designer. In the second phase, the designer (or the manufacturer) will couple the configurable circuit to one or more external devices. In some circumstances, this may mean mounting the configurable device onto a printed circuit board (PCB) that may or may not be part of a multi-component device that the designer (or the manufacturer) is providing to the end-user. The designer (or the manufacturer) will want the configurable circuit to carry out some sort of desired application behavior and will thus provide the configuration data needed to configure the device in a manner such that the configurable circuit exhibits the desired application behavior. The provided configuration data is typically stored in the configuration memory of the configurable circuit if the memory is nonvolatile or in an external nonvolatile memory coupled to the configurable circuit. In the third phase, the configurable circuit is provided to the end-user as a stand-alone device or as part of a multi-component device. The end-user will then typically run the configurable circuit in accordance with the configuration data provided by the designer (or manufacturer).

The configuration data is usually the property of the designer (or the manufacturer), thus it is typically desirable to protect such data from reverse engineering. At least two approaches are currently being used to protect such data. A first approach consists in fully storing the configuration data on the configurable circuit and having a protection bit that prevents reading back the configuration data from the device. A second approach consists in asking the designer (or the manufacturer) to provide an encryption key, store it onto the configurable circuit, write a protection bit so that the key cannot be read back and encrypt the configuration data so that it can configure only configurable circuits that are provided with the encryption key. However, both approaches are less than desirable because they either require a configuration memory that is nonvolatile, which may not be possible for configurable circuits with large arrays, or they require that the designer (or manufacturer) take intrusive and often cumbersome measures.

Accordingly, a reconfigurable circuit that is able to protect configuration data without requiring intrusive measures is desirable.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

In the following description, for purposes of explanation, specific numbers, materials, and configurations are set forth in order to provide a thorough understanding of the present invention. However, it will be apparent to one skilled in the art that the present invention may be practiced without the specific details. In other instances, well-known features are omitted or simplified in order not to obscure the present invention.

Reference in the specification to "various embodiments" or "some embodiments" means that a particular feature, structure, or characteristic described in connection with the embodiments are included in at least one embodiment of the invention. The appearances of the phrase "in various embodiments" in various places in the specification do not necessarily all refer to the same embodiments, although they may.

Figure 1A:
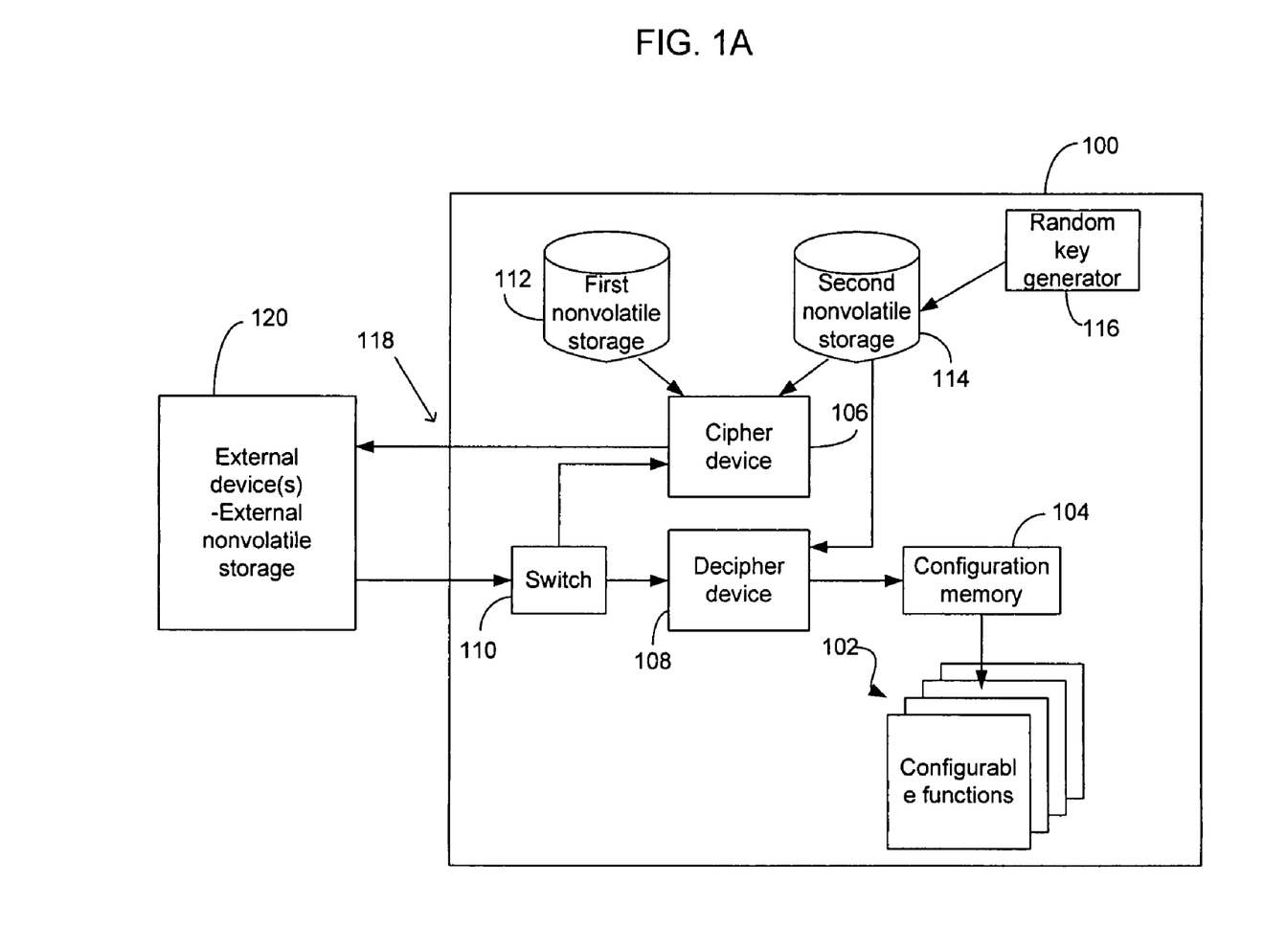
FIG. 1A illustrates a configurable circuit with configuration data protection features in accordance with various embodiments.

FIG. 1A depicts a configurable circuit in accordance with various embodiments of the invention. For the embodiments, the configurable circuit 100 include configurable functions 102, a configuration memory 104, a cipher device 106, a decipher device 108, an input/output (I/O) interface 118, and a first and a second nonvolatile storage 112 and 114, coupled to each other as shown. For the embodiments, the configurable circuit 100 may further include a random key generator 116 and a switch 110 coupled to selected ones of the earlier enumerated elements as shown. As will be described in more detail below, for these embodiments, elements 106-116 are advantageously employed to enable configuration data of configurable circuit 100 to be protected. In particular, elements 106-116 are employed to effectuate the protection by enabling configuration data of configurable circuit 100 to be encrypted by the configurable circuit 100 itself. Further, the encrypted configuration data are exported and re-provided to the configurable circuit 100 during operation, such as at power up of the configurable circuit 100. The main elements 106-116 are employed to effectuate the desired protection will be further described in detail in the description to follow.

As illustrated, for the embodiments, one or more external devices 120 are employed to provide the initial unciphered (herein "clear") configuration data to the configurable circuit 100. More specifically, the one or more external devices 120 may be employed to provide the clear configuration data to the cipher device 106 through the I/O interface 118 and switch 110. Further, the one or more external devices 120 may be employed to store the ciphered configuration data provided back by the configurable circuit 100, and more specifically, provided back by the cipher device 106. Still further, the stored ciphered configuration data may be re-provided to the configurable circuit 100 during operation, e.g., at power up of the configurable circuit 100. In alternate embodiments, the initial unciphered (herein "clear") configuration data may be provided from other external source instead. That is, in these alternate embodiments, the external source employed to provide the initial unciphered (clear) configuration data is not employed to store the ciphered configuration data provided back from the configurable circuit 100. Rather, different external I/O device(s) 120 are employed instead for storing the ciphered configuration data and for re-providing the ciphered configuration data back to the configurable circuit 100.

The external device(s) 120 are coupled to the cipher device 106 through the I/O interface 118 at least during the period that data are being transferred between the configurable circuit 100 and the external device(s) 120. In various embodiments, the external device(s) 120 may include an external nonvolatile storage. In some embodiments, the external nonvolatile storage comprises programmable read only memory (PROM).

Continuing to refer to FIG. 1A, as illustrated and earlier described, for the embodiments, the cipher device 106 is coupled to the I/O interface 118. The cipher device 106 is employed to cipher the unciphered (clear) configuration data when the clear configuration data is initially provided. As illustrated, for the embodiments, an input side of the cipher device 106 is coupled to the I/O interface 118 through the switch 110, which routes clear configuration data to the cipher device 106. An output side of the cipher device 106 is directly coupled to the I/O interface 118, to facilitate the cipher device 106 in outputting the resulting ciphered configuration data back to the external device(s) 120.

In various embodiments, in order to cipher the configuration data, the cipher device 106 employs a ciphering key that may be stored in the second nonvolatile storage 114 coupled to the cipher device 106. In various embodiments, where the configurable circuit 100 includes the random key generator 116, the ciphering key is generated by and stored into the second nonvolatile storage 114 by the random key generator 116. In other embodiments, the ciphering key may be provided from an external source, and stored into the second nonvolatile storage 114.

Further, for the embodiments, the cipher device 106 is adapted to be disabled once it has outputted the ciphered configuration data back to the one or more external devices 120. In various embodiments, the cipher device 106 is enabled or disabled in view of an enabled/disabled indicator stored in the first nonvolatile storage 112 coupled to the cipher device 106. For the embodiments, the cipher device 106 is adapted to consider itself enabled absent of a disabled indicator stored in the first nonvolatile storage 106, and disabled if a disabled indicator is stored in the nonvolatile storage 106. The disabled indicator may be stored into the first nonvolatile storage 106 upon the cipher device 106 outputting the encrypted configuration data to the external device(s) 120. In various embodiments, the enabled/disabled indicator comprises an enabled/disabled bit in an unset and a set state. In alternate embodiments, the cipher device 106 may be disabled via other techniques. In some embodiments, the enable/disable indicator stored in the first nonvolatile storage 112 may be capable of transitions from an enable to a disable state but not from the disable state to the enable state. In various embodiments, the enable/disable indicator is capable of transitions from an enable to a disable state but not from the disable state to the enable state.

As described earlier, during operation, e.g., at power up of the configurable circuit 100, the ciphered configuration data may be re-provided from external device(s) 120 to the configurable circuit 100. More specifically, the ciphered configuration data may be re-provided to the decipher device 108, which for the embodiments, is coupled to the I/O interface 118 through the switch 110. The switch 110, in various embodiments, routes the ciphered configuration data to the decipher device 108.

On receipt of the ciphered configuration data, the decipher device 108 deciphers the ciphered configuration data, and transfers the deciphered configuration data to the configuration memory 104 coupled to the decipher device 108.

In various embodiments, the decipher device 108 employs a deciphering key stored in the second nonvolatile storage 114, which is coupled to the decipher device 108. In the embodiments in which the configurable circuit 100 includes the random key generator 116, the deciphering key is complimentarily generated and stored into the second nonvolatile storage 114 by the integrated random key generator 116. In alternate embodiments in which the configurable circuit 100 is without the random key generator 116, the deciphering key may be provided and stored into the second nonvolatile storage 114 from an external source, which may or may not be the same external source providing the ciphering key.

Still referring to FIG. 1A, configuration functions 102 are coupled to the configuration memory 104, and are configured based on the deciphered configuration data stored into configuration memory 104 by the decipher device 108. Accordingly, the various embodiments of configurable circuit 100 may allow a designer, a manufacturer, or other entities or persons to configure the configurable circuit for an application behavior, and protect the configuration data from being reversed engineered without the need to take extraordinary or intrusive measures in order to protect such data.

Before proceeding to further describe how a designer or others may employ the earlier described features of the configurable circuit 100 to protect its design (i.e. the configuration data to configure the configurable circuit 100 to provide an application behavior), it should be noted that, while for ease of understanding, the present invention has thus far been described with the embodiments illustrated by FIG. 1A, the present invention is not so limited. In alternate embodiments, the configurable circuit 100 may be practiced without some of the elements described or with other additional elements.

For example, in alternate embodiments, the configurable circuit 100 may be practiced without the employment of switch 110. Separate ports and/or routing paths may be provided for routing the unciphered and ciphered configuration data to the cipher device 106 and decipher device 108 respectively, Similarly, as already described, in alternate embodiments, the configurable circuit 100 may be practiced without the integrated random key generator 116. The ciphering and deciphering (herein "ciphering/deciphering") keys may be generated externally and provided to the configurable circuit 100.

As a further example, the first and second nonvolatile storage 112 and 114 may be provided by a common storage device. Also, the ciphering key and the deciphering key may or may not be identical or one may be derived from the other. Likewise, the cipher and decipher devices 106 and 108 may be combined, at least in part.

Figure 1B:
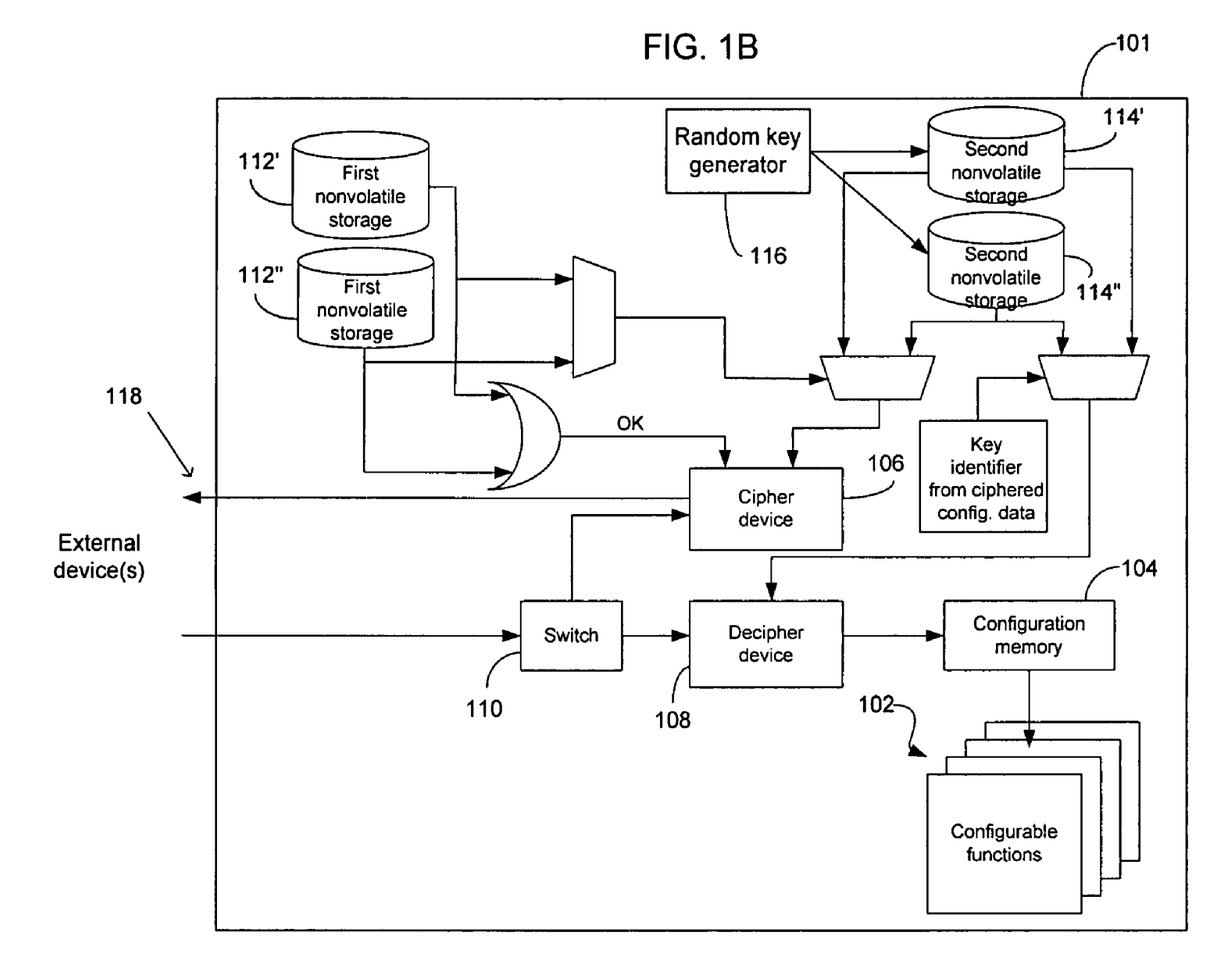
FIG. 1B illustrates another configurable circuit with configuration data protection features in accordance with alternative embodiments.

In some embodiments, the first and second nonvolatile storage 112 and 114 can be replicated so that the configurable circuit 100 can cipher more than a single configuration data. For these embodiments, multiple cipher/decipher keys may be stored. Doing so may allow several different sets of configuration data for several different configurations to be ciphered and later unciphered and used. When a clear configuration data is presented, the next available cipher/decipher key is used and the associated enable/disable indicator stored in the first nonvolatile storage 112 is put in the disable state. In some embodiments, the configuration data may start with a bit that indicates whether it is a clear or a ciphered configuration and in case it is ciphered, this bit may be followed by an identifier of the cipher/decipher key to be used (prefixing the data with such an identifier being part of the ciphering process, the selection does not incur any action from the user). Such an embodiment is described in FIG. 1B. In particular, FIG. 1B depicts a configurable circuit 101 in accordance with an alternative embodiment that includes multiple first nonvolatile storages 112' and 112" and multiple second nonvolatile storages 114' and 114".

In various embodiments, the configurable circuit 100 may be a Field Programmable Gate Array (FPGA) reconfigurable circuit.

Figure 2:
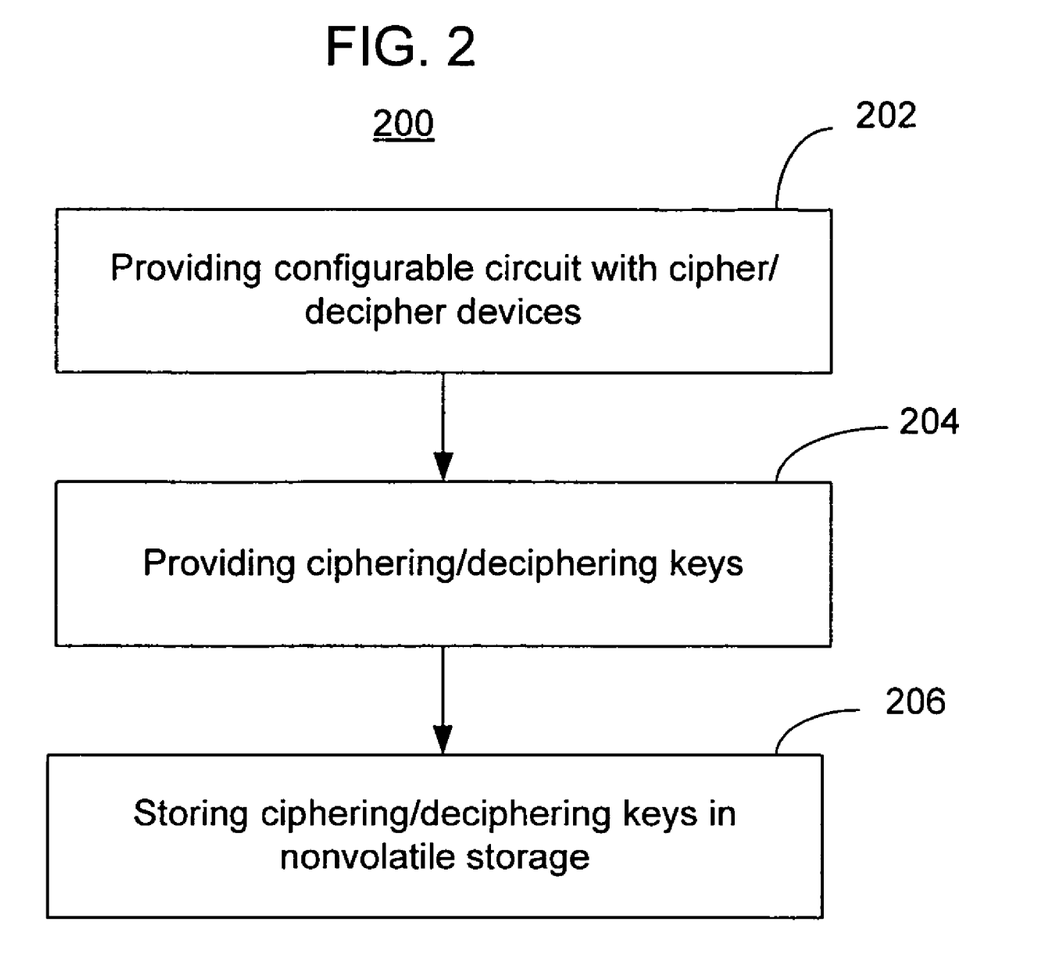
FIG. 2 illustrates a process for providing a configurable circuit of FIG. 1A including a cipher and/or a decipher key in accordance with various embodiments.

FIG. 2 depicts a process for providing the configurable circuit 100 of FIG. 1A including the ciphering and deciphering (ciphering/deciphering) keys, in accordance with various embodiments. In some embodiments, the process 200 may be practiced by the manufacturer of the various embodiments of the configurable circuit 100. As illustrated, the process 200 may begin when a configurable circuit 100 with the cipher and decipher devices 106-108 is provided at 202. The provided configurable circuit 100 may include the configurable functions 102, the configuration memory 104, the cipher and the decipher devices 106-108, the first and the second nonvolatile storages 112 and 114, the I/O interface 118, and so forth, as described earlier.

After the configurable circuit 100 is provided, the ciphering/deciphering keys may be provided or generated at 204. In embodiments without the random key generator 116, this may be accomplished by providing the ciphering/deciphering keys from an external key source. Alternatively, if the configurable circuit 100 includes the random key generator 116, the ciphering/deciphering keys can be internally generated, by operating the random key generator 116. Once provided or generated, the ciphering/deciphering keys may be stored in the second nonvolatile storage 114 at 206.

Thereafter, the manufacturer may ship or otherwise distribute the configurable circuit 100 with the ciphering/deciphering keys stored therein. The configurable circuit 100 is now enabled to protect the configuration data provided to it to effectuate an application behavior. Note that in alternative embodiments where the configurable circuit 100 includes the random key generator 116, the ciphering/deciphering keys may be generated post shipping or distribution by the manufacturer. That is, for these embodiments, the ciphering/deciphering keys may be generated after the configurable circuit 100 leaves the manufacturer and is in the possession of "someone" other than the manufacturer. Note that in various embodiments the ciphering/deciphering keys need not be known by anybody as long as they are stored in the second non-volatile storage. Hence, the use of a random key generator 116 may be completely transparent, i.e., the actual value provided by the random key generator 116 will have no impact on the process. Only the ciphered configuration data may actually depend on the ciphering/deciphering keys and they are only stored and re-provided later, without any computation executed that depend on its value.

In still other alternate embodiments, the process 200 may include additional operations in other alternative embodiments. These additional operations include, for example, one or more of the operations included in the process 300 of FIG. 3 including operations such as coupling the configurable circuit 100 to one or more external devices 120.

Figure 3:
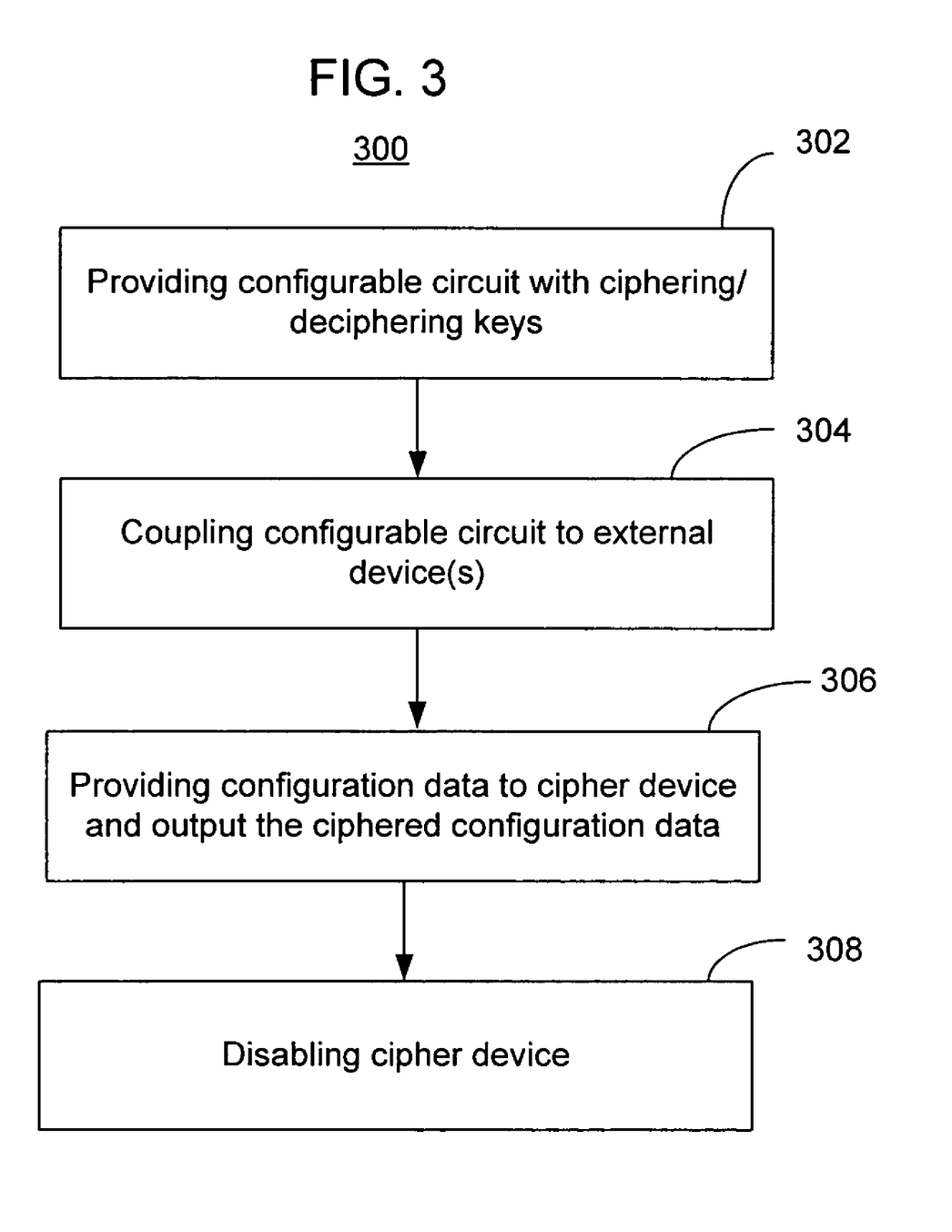
FIG. 3 illustrates a process for providing a configurable circuit of FIG. 1A including with the cipher device disabled, in accordance with various embodiments.

FIG. 3 depicts a process for providing the configurable circuit of FIG. 1A with the cipher device disabled, in accordance with various embodiments. The process 300 may be practiced by a manufacturer or a designer to configure one or more configurable circuits 100 to provide an application behavior, and to protect the configuration data provided to effectuate the application behavior from being reverse engineered.

As illustrated, the process 300 may begin when a configurable circuit 100 with integral ciphering/deciphering keys is provided at 302. As described earlier, the ciphering/deciphering keys may be stored in the second nonvolatile storage 114 of the configurable circuit 100. The ciphering/deciphering keys may be stored in the second nonvolatile storage 114 by the integrated random key generator 116, or provided from an external key source.

A designer, in particular, a system designer, may couple the configurable circuit 100 to one or more external devices 120 at 304. The one or more external devices 120, as previously described, may provide to the configurable circuit 100, the configuration data to effectuate the application behavior. In turn, a ciphered version of the configuration data is outputted back to the one or more external devices 120 at 306, which may then be subsequently used to operate the configurable circuit 100 in a protected manner.

As described earlier, once the ciphered configuration data has been outputted, the cipher device 106 is disabled at 308. In various embodiments, the cipher device 106 may disable itself, once the ciphered configuration data has been outputted back to the one or more external devices 120. In some embodiments, the cipher device 106 disables itself by setting an enabled/disabled bit in the first nonvolatile storage 112.

Accordingly, thereafter the designer may ship or otherwise distribute for use both the configurable circuit 100 with the disabled cipher device 106 and the ciphered configuration data. During operation, as described earlier, the configuration data may be protected from reverse engineering. In various embodiments, the configurable circuit 100 with the cipher device 106 disabled, and the ciphered configuration data, may be shipped/distributed separately, or together. For example, in some embodiments, the configurable circuit 100 with the disabled cipher device 106, and the external device(s) 120 having the ciphered configuration data, are both disposed on a common circuit board that is shipped/distributed as a single unit. In other embodiments, however, the configurable circuit 100 with the disabled cipher device 106 and the ciphered configuration data are shipped/distributed separately.

Figure 4:
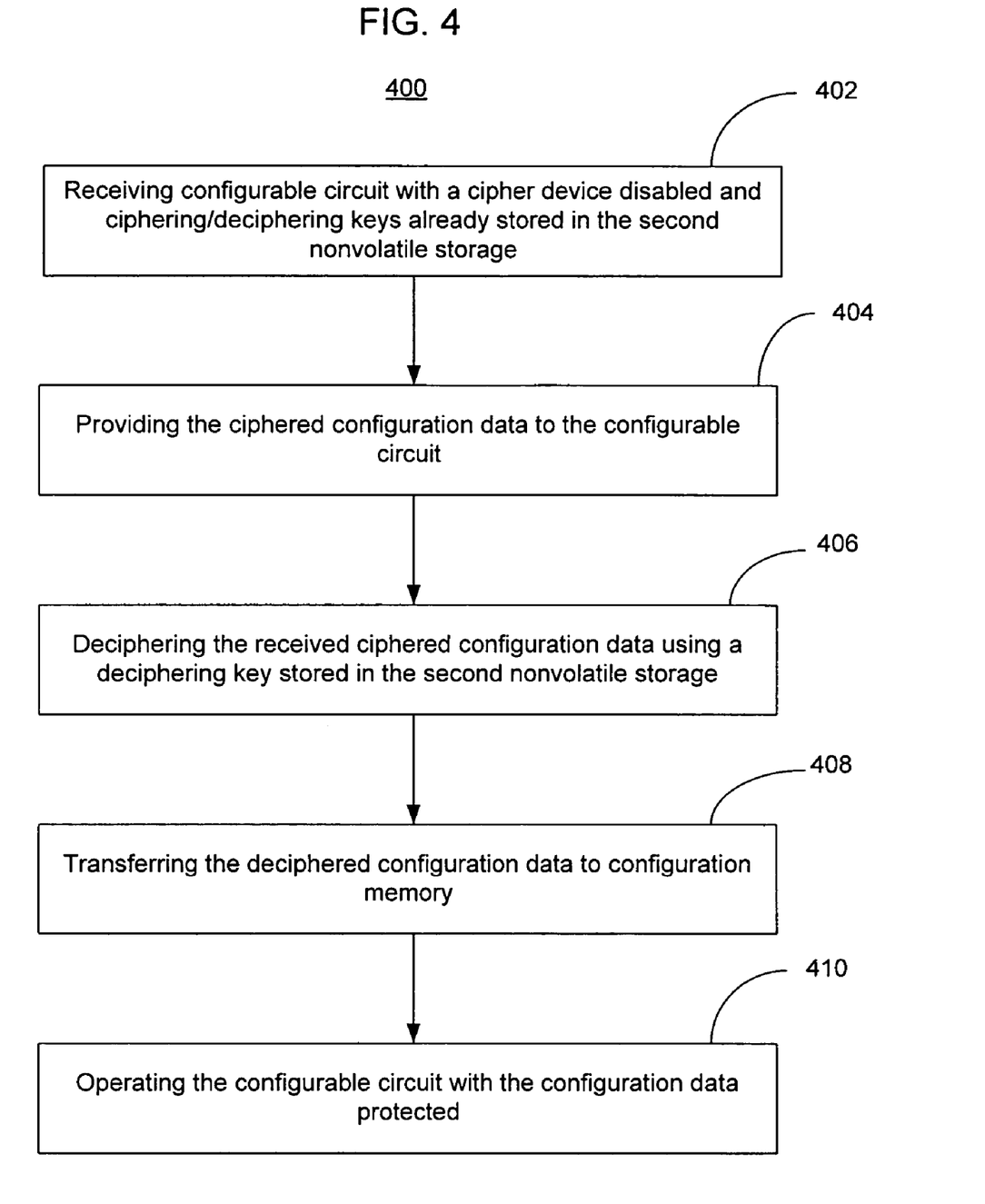
FIG. 4 illustrates a process for operating a configurable circuit of FIG. 1A in a protected manner, in accordance with various embodiments.

FIG. 4 illustrates a process for operating the configurable circuit of FIG. 1A in a protected manner, in accordance with various embodiments. The process 400 may be practiced by a user of a system designed using various embodiments of the configurable circuit 100 of the present invention.

As illustrated, the process 400 may begin with the receipt of the configurable circuit 100 with the disabled cipher device 106 and the ciphering/deciphering keys already stored in the second nonvolatile storage 114 at 402. The receipt of the configurable circuit 100 with the disabled cipher device 106, in various embodiments, may further include receiving ciphered configuration data. As described earlier, the configurable circuit 100 with the disabled cipher device 106 and the ciphered configuration data may be jointly received when, for example, the configurable circuit 100 with the disabled cipher device and the external device(s) 120 having the ciphered configuration data, are both disposed on a common circuit board.

Thereafter, the ciphered configuration data may be provided from the external device(s) 120 to the configurable circuit 100, more specifically, to the decipher device 108 at 404. On receipt of the ciphered configuration data, the decipher device 108 deciphers the received ciphered configuration data, using a deciphering key stored in the second nonvolatile storage 114 at 406. On deciphering the ciphered configuration data, the decipher device 108 transfers the deciphered configuration data to configuration memory 104, enabling configuration functions 102 to be configured for the desired application behavior at 408. On configuration, the configurable circuit 100 may then be operated with the configuration data being protected at 410.

Although specific embodiments have been illustrated and described herein, it will be appreciated by those of ordinary skill in the art and others, that a wide variety of alternate and/or equivalent implementations may be substituted for the specific embodiments shown and described without departing from the scope of the present invention. This application is intended to cover any adaptations or variations of the embodiments discussed herein. Therefore, it is manifested and intended that the invention be limited only by the claims and the equivalents thereof.

What is claimed is:

1. A configurable circuit, comprising:
a plurality of configurable functions;
a configuration memory coupled to the configurable functions to store configuration data to configure the configurable functions;
an input/output (I/O) interface;
a cipher device coupled to the I/O interface, and adapted to encipher configuration data received through the I/O interface, and to output the resulting ciphered configuration data outside the configurable circuit through the I/O interface, wherein the cipher device is further adapted to be placed into a disabled state; and
a decipher device coupled to the I/O interface, adapted to decipher previously outputted ciphered configuration data received back through the I/O interface, and to output the resulting deciphered configuration data to the configuration memory.

2. The configurable circuit of claim 1, wherein the configurable circuit is a Field Programmable Gate Array (FPGA) reconfigurable circuit.

3. The configurable circuit of claim 1, wherein said cipher and decipher devices are coupled to the I/O interface through a switch, the switch adapted to route clear configuration data to the cipher device and to route subsequent enciphered configuration data to the decipher device.

4. The configurable circuit of claim 1, further comprising a first nonvolatile storage coupled to the cipher device and the decipher device, the first nonvolatile storage adapted to store ciphering/deciphering keys to be used by the cipher device to encipher the configuration data and the decipher device to decipher the configuration data.

5. The configurable circuit of claim 4, further comprising a random cipher key generator coupled to the first nonvolatile storage to generate and store ciphering/deciphering keys in the first nonvolatile storage.

6. The configurable circuit of claim 4, wherein said first nonvolatile storage adapted to receive from an external key source, ciphering/deciphering keys.

7. The configurable circuit of claim 4, further comprising a second nonvolatile storage coupled to said cipher device adapted to store enable/disable indicator to indicate to said cipher device whether said cipher device is enabled or disabled, said enable/disable indicator capable of transitioning from an enable to a disable state but not from the disable state to the enable state.

8. The configurable circuit of claim 7, further comprising:
a third nonvolatile storage coupled to said cipher device adapted to store another enable/disable indicator to indicate to said cipher device whether said cipher device is enabled or disabled for ciphering another configuration data, said enable/disable indicator capable of transitioning from an enable to a disable state but not from the disable state to the enable state; and
a fourth nonvolatile storage coupled to the cipher device and the decipher device adapted to store additional ciphering/deciphering keys to be used by the cipher device to cipher the another configuration data and the decipher device to decipher the another configuration data.

9. A method, comprising:
providing a configurable circuit, including:
a plurality of configurable functions;
a configuration memory coupled to the configurable functions to store configuration data to configure the configurable functions;
an input/output (I/O) interface;
a cipher device coupled to the I/O interface, and adapted to encipher configuration data received through the I/O interface, and to output the resulting ciphered configuration data outside the configurable circuit through the I/O interface, wherein the cipher device is further adapted to be placed into a disabled state; and
a decipher device coupled to the I/O interface, adapted to decipher previously outputted ciphered configuration data received back through the I/O interface, and to output the resulting deciphered configuration data to the configuration memory; and providing ciphering/deciphering keys, the ciphering/deciphering keys to be used by the cipher and decipher devices to encipher and decipher the configuration data respectively.

10. The method of claim 9, wherein said providing ciphering/deciphering keys comprises providing ciphering/deciphering keys from an external key source.

11. The method of claim 9, wherein said providing a configurable circuit comprises providing a Field Programmable Gate Array (FPGA) reconfigurable circuit having the reconfigurable functions, the configurable memory, the I/O interface, and the cipher and decipher devices.

12. The method of claim 9, wherein said providing comprises providing a configurable circuit that includes a first nonvolatile storage coupled to the cipher device and the decipher device to store ciphering/deciphering keys to be used by the cipher device to encipher the configuration data and the decipher device to decipher the configuration data.

13. The method of claim 12, wherein the configurable circuit further includes a random key generator coupled to the first nonvolatile storage and said providing ciphering/deciphering keys comprises operating the random key generator to generate ciphering/deciphering keys, and storing the generated ciphering/deciphering keys into the first nonvolatile storage.

14. The method of claim 12, wherein said providing comprises providing a configurable circuit that includes a second nonvolatile storage coupled to said cipher device adapted to store enable/disable indicator to indicate to said cipher device whether said cipher device is enabled or disabled, said enable/disable indicator capable of transitioning from an enable to a disable state but not from the disable state to the enable state.

15. A method, comprising:
providing a configurable circuit, including:
a plurality of configurable functions;
a configuration memory coupled to the configurable functions to store configuration data to configure the configurable functions;
an input/output (I/O) interface;
a cipher device coupled to the I/O interface, and adapted to encipher configuration data received through the I/O interface, and to output the resulting ciphered configuration data outside the configurable circuit through the I/O interface, wherein the cipher device is further adapted to be placed into a disabled state; and a decipher device coupled to the I/O interface, adapted to decipher previously outputted ciphered configuration data received back through the I/O interface, and to output the resulting deciphered configuration data to the configuration memory; and providing the configuration data through the I/O interface to the cipher device and recieving the resulting enciphered configuration data.

16. The method of claim 15, further comprising coupling the I/O interface of the configurable circuit to one or more external devices.

17. The method of claim 16, wherein said one or more external devices comprises an external nonvolatile storage device, and the method further comprises storing said received enciphered configuration data in the external nonvolatile storage.

18. The method of claim 17, wherein the method further comprises storing the configuration data in the external nonvolatile storage before the configuration data is enciphered.

19. The method of claim 16, wherein said providing to the cipher device the configuration data comprises providing to the cipher device the configuration data from one of the one or more external devices.

20. The method of claim 15, wherein said providing a configurable circuit comprises providing a Field Programmable Gate Array (FPGA) reconfigurable circuit having the reconfigurable functions, the configuration memory, the I/O interface, and the cipher and decipher devices.

21. The method of claim 15, wherein said providing comprises providing a configurable circuit that includes a nonvolatile storage coupled to said cipher device adapted to store enable/disable indicator to indicate to said cipher device whether said cipher device is enabled or disabled, said enable/disable indicator capable of transitioning from an enable to a disable state but not from the disable state to the enable state.

22. The method of claim 21, further comprising disabling the cipher device by storing a disabling indicator into the nonvolatile storage.

* * * * *